United States Patent [19]

Kaise

[11] Patent Number: 4,496,278
[45] Date of Patent: Jan. 29, 1985

[54] INDUSTRIAL ROBOT EQUIPPED WITH ARTICULATED ARM UNIT

[75] Inventor: Tatsuo Kaise, Yokosuka, Japan

[73] Assignee: Okamura Corporation, Yokohama, Japan

[21] Appl. No.: 390,372

[22] Filed: Jun. 21, 1982

[30] Foreign Application Priority Data

Apr. 7, 1982 [JP] Japan .................. 57-56496

[51] Int. Cl.³ .......................... B66C 23/00
[52] U.S. Cl. .................... 414/735; 74/479; 74/665 M; 901/21
[58] Field of Search ............... 414/1, 4, 7, 729, 730, 414/735; 294/88; 74/469, 479, 665 M; 901/15, 21, 23, 48

[56] References Cited

U.S. PATENT DOCUMENTS 4,215,972  8/1980  Yamasaki et al. .............. 414/917 X

FOREIGN PATENT DOCUMENTS 75760   1/1977  Japan ................. 414/735
707793  1/1980  U.S.S.R. ............. 414/735
763082  9/1980  U.S.S.R. ............. 414/735

*Primary Examiner*—Leslie J. Paperner
*Assistant Examiner*—Donald W. Underwood
*Attorney, Agent, or Firm*—Poms, Smith, Lande & Rose

[57] ABSTRACT

Disclosed herein is an industrial robot equipped with an articulated arm unit which includes a first arm, second arm, a holder case and a holder. The basal end portion is pivotally attached to a shoulder shaft, which is formed of a first and second shafts disposed on the same axis and rotatable independently from each other. A differential transmission mechanism is arranged over mutually-opposing end portions of the first and second shafts. First drive means is formed by the first shaft and first coupling means so as to rotate the holder. Second drive means is also formed by the second shaft and second coupling means so as to rotate the holder case. The second drive means is also provided with third coupling means, which is also connected to the differential transmission mechanism, so as to compensatively rotate the holder. Owing to the adoption of the above structure, the above industrial robot can actuate its holder or arms independently without developing any induced motion at other parts of the industrial robot. Since a compensatory mechanism is provided at a basal part of the arm unit for the holder, the free end portion to which a hand is attached can be constructed in a small size. It is easy to teach handling work to the above industrial robot.

8 Claims, 10 Drawing Figures

INDUSTRIAL ROBOT EQUIPPED WITH ARTICULATED ARM UNIT

BACKGROUND OF THE INVENTION

This invention relates to an industrial robot equipped with an articulated arm unit.

More particularly, the present invention relates to an industrial robot adapted, for example, to carry out the loading, transfer or its analogous work of heavy items at factories and the like in place of human workers, which industrial robot is capable of memorizing the details of work assigned thereto and performing that work repeatedly by a command to that effect.

The industrial robot according to this invention is of such a type that it is equipped with an articulated arm unit capable of performing complex motions like human arms, and the articulated arm unit is formed of a first arm pivotally supported at its basal end portion, a second arm pivotally coupled with the first arm, a holder case serving as a wrist and pivotally connected to the free end of the second arm and a holder disposed in the holder case in such a way that the holder can turn in a direction perpendicular to the direction of rotation of the holder case. The holder may be provided replaceably with a hand most suitably selected for an item to be handled.

To perform the loading or unloading work of heavy items with such a hand, a great power is required. Thus, electric-hydraulic servo system is used to actuate the hand. The robot is numeric controlled by measuring the extent of each movement of each arm, hand or the like by an encoder or its analogous means so as to perform accurate motions. Accordingly, robots of this type are each provided with a microcomputer as its brain.

It is most common for robots of the above-mentioned type to have them store first of all assigned handling motions in their memories and then actuate them. It is thus indispensable for operators to teach them how their hands should be moved.

Conventional articulated arm units, which made use of gear trains, involved a problem that this teaching work was difficult with them.

For example, they were accompanied by such a drawback that it was impossible to carry out any teaching work requiring a smooth actuation of an arm, since, when a holder coupled with a holder case via a gear train was turned, the holder case also developed an induced motion such as an oscillation motion. To solve the above-mentioned problem of induced motions, it may be contemplated to incorporate a mechanism to perform compensatory motions in the holder case. This however creates another problem that the holder case becomes inevitably large in its external dimensions and, when a hand is attached to the holder case, its handling work is subjected to limitations, particularly, in a narrow place.

SUMMARY OF THE INVENTION

An object of this invention is to provide an industrial robot equipped with an articulated arm unit which is so constructed that an actuation of each part such as a turning of its holder or a turning of its arm does not develop any induced motion at the remaining parts thereof.

Another object of this invention is to provide an industrial robot equipped with an articulated arm unit, which industrial robot is further provided at a basal part of the arm a mechanism to compensate any motion induced at the holder so as to make the free end portion of the arm smaller.

Accordingly, in the present invention, a first and second shafts which support pivotally a first arm of the articulated arm and are independent from each other are provided at the basal end portion of the first arm. The holder is turned by drive means which rotates the first shaft.

In addition, the holder case is caused to perform an oscillation motion by drive means which rotates the second shaft. Any rotation of the holder induced by an oscillation motion of the holder case is compensated by rotating the holder in an opposite direction through a differential transmission system provided between the first and second shafts.

The holder and holder case and their corresponding drive means are each connected using coupling means which consists of a pair of sprockets and an endless chain, so that the shaft of the holder can always lie in a predetermined direction.

Furthermore, a quadric kinematic link mechanism, i.e., the so-called pantagraph mechanism is constructed by the first and second arms as well as a pair of links whose one ends are pivotally connected to these arms. Besides the above-mentioned drive means for rotating the holder and holder case, there are also provided third drive means for horizontally displacing back and forth a connector shaft of the links and fourth drive means adapted to displace the basal end of the first arm up and down. Thus, back and forth movements and up and down movements of the holder and mutually independent rotations of the first and second arms are all performed by the above pair of drive means.

In one aspect of this invention, there is thus provided an industrial robot equipped with an articulated arm unit including a first arm pivotally attached at its basal end portion to a shoulder shaft, a second arm pivotally coupled at its basal end portion to the free end of the first arm by means of an elbow shaft, a holder case pivotally connected to the free end of the second arm by means of a wrist shaft, and a holder supported by the holder case in such a way that the holder is turnable about an axis, which extends perpendicularly to the wrist shaft, by means of a shaft journalled on the wrist shaft. The shoulder shaft for the first arm is formed of a first and second shafts disposed on the same axis and rotatable independently from each other, a differential transmission mechanism is arranged over mutually-opposing end portions of the first and second shafts. First drive means is formed by the first shaft and first coupling means connected thereto so as to rotate the holder. Second drive means is also formed by the second shaft and second coupling means connected thereto so as to rotate the holder case. The second drive means also includes third coupling means connected to the differential transmission mechanism, whereby compensatively rotating the holder.

BRIEF DESCRIPTION OF THE DRAWINGS

In order that the present invention may be better understood, a preferred embodiment will be described with reference to the accompanying drawings, in which.

DESCRIPTION OF THE PREFERRED EMBODIMENT

Figure 1:
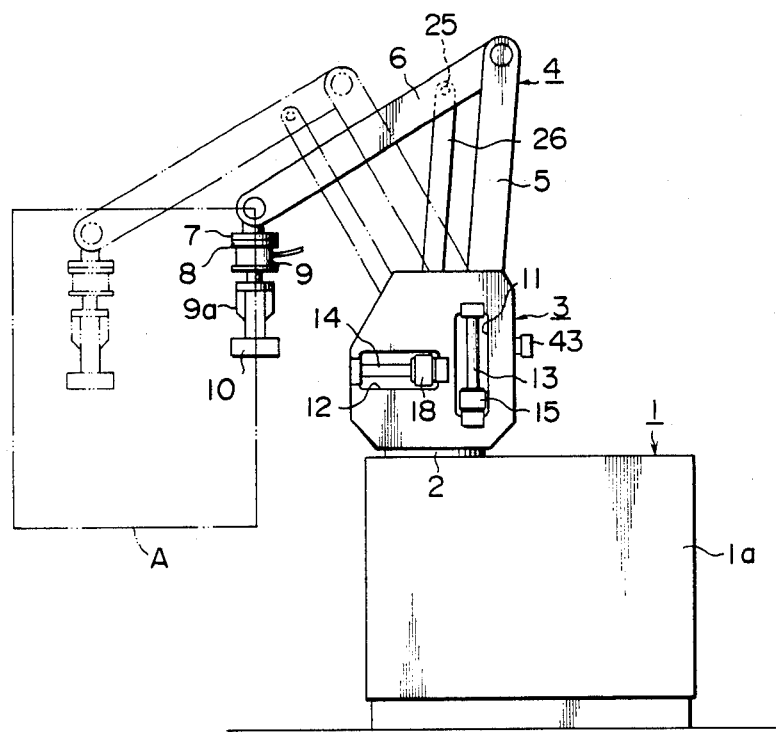
FIG. 1 is a side elevation of an industrial robot according to the preferred embodiment of this invention.

Referring first to FIG. 1, numeral 1 indicates a robot main body of a rectangular box-like shape. In a housing 1a, a hydraulic pressure source as well as various electric and hydraulic equipments for controlling motions of an arm unit, which arm unit will be described later, are enclosed.

Designated at numeral 2 is a shaft provided upright on the upper face of the housing 1a. An attachment frame 3 having a square U-like configurations is pivotally supported on the shaft 2. The attachment frame 3 is rotatable about a vertical axis by drive means which is not illustrated.

An arm unit 4 is pivotally mounted on the attachment frame 3. The structure of the arm unit 4 will next be described briefly and its detailed description will be given later in this specification.

Numeral 5 indicates a first arm whose basal end portion is attached to the attachment frame 3 in such a manner that it is displaceable up and down and is rotatable about a horizontal axis. A second arm 6 is pivotally coupled to the free end portion of the first arm 5. A holder case 7 is then connected pivotally to the free end of the second arm 6. The first arm 5, second arm 6 and holder case 7 are arranged in such a manner that they can turn in the same plane.

On the holder case 7, a holder 8 is pivotally supported so that the holder 8 can turn in the holder case 7. A hand 9, adapted to grip an article, is mounted on the holder 8.

The hand 9 may be replaceable by another hand in accordance with the shape and nature of each article to be handled. In the illustrated embodiment, the hand 9 has two mutually-closable fingers 9a which are adapted to grip the article 10.

Next, referring to FIGS. 2 and 3, the arm attachment frame 3 will be described.

Figure 2:
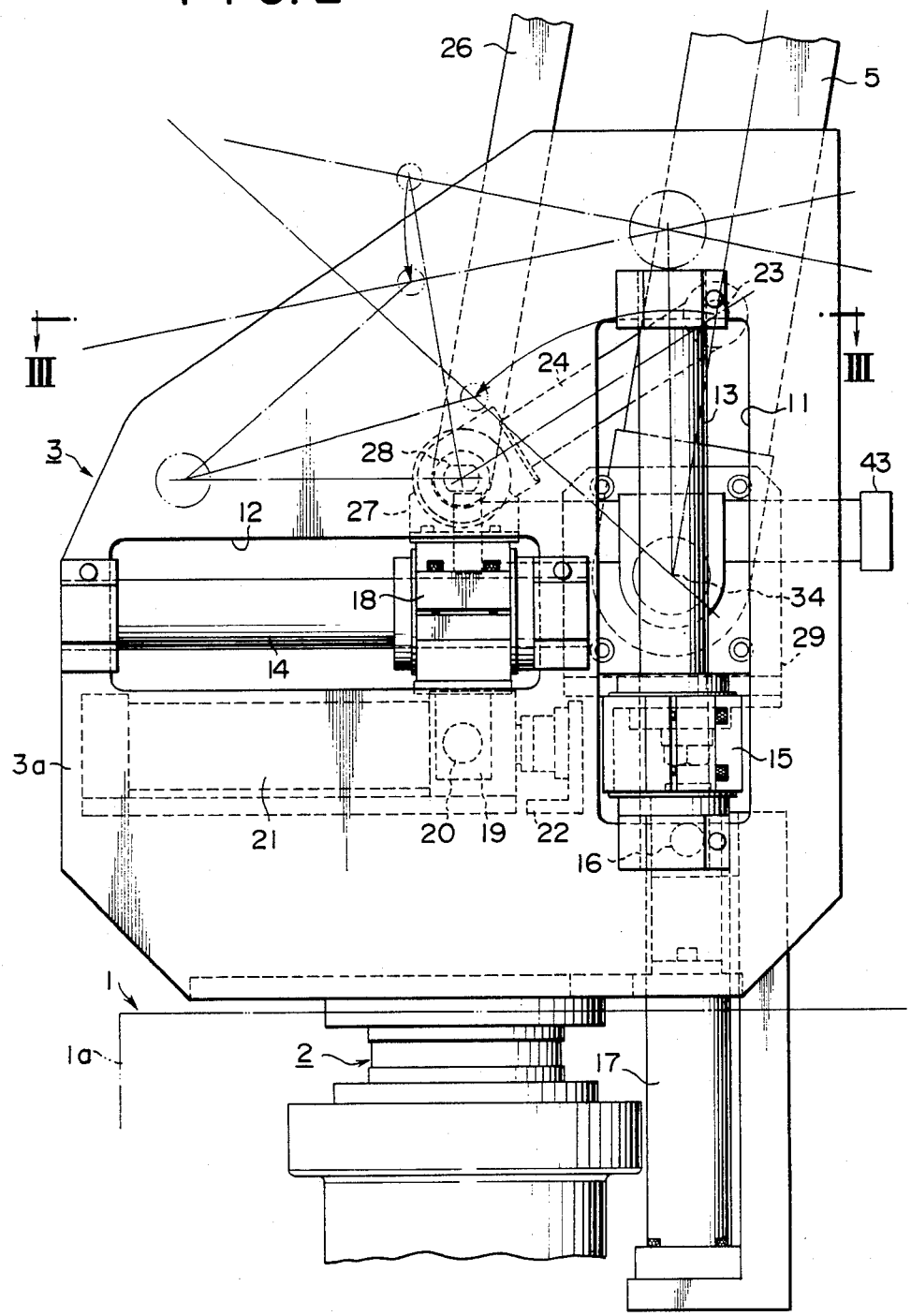
FIG. 2 is a side view showing an attachment frame for an arm unit on an enlarged scale.
Figure 3:
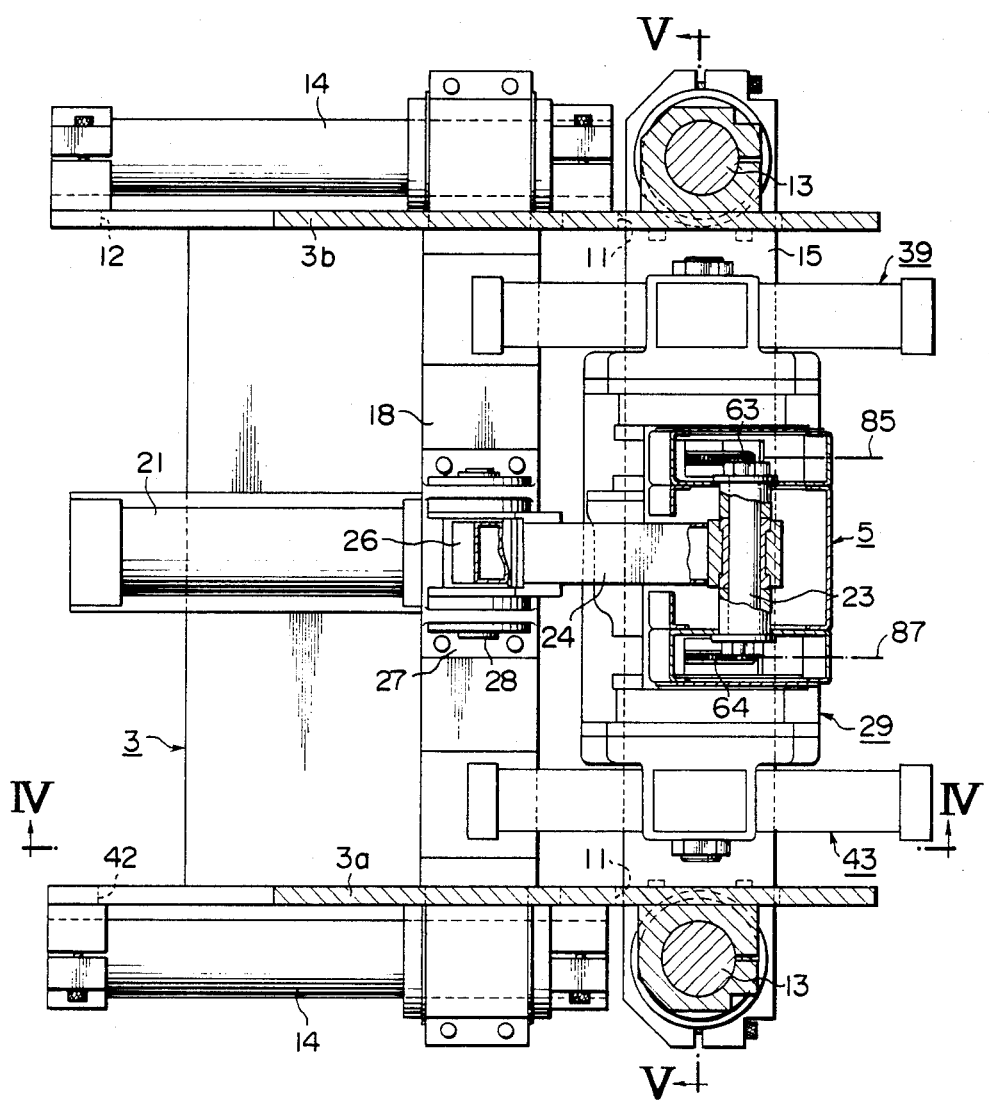
FIG. 3 is a plan view of the attachment frame of FIG. 2.

As apparent from FIG. 2, a vertically elongated window opening 11 is formed in a rear part of each of left and right side walls 3a, 3b of the arm attachment frame 3 whereas a horizontally elongated window opening 12 is formed in a vertically intermediate part of each of the side walls.

Vertical guide members 13 are fit respectively in the left and right window openings 11. Horizontal guide members 14 are also fit respectively in the left and right window openings 12.

A vertically-displaceable horizontal plate 15 is fit at both ends thereof over the vertical guide members. On the lower face of the plate 15, is fixedly secured the free end of a rod 17a of a first drive source, namely, a hydraulic cylinder 17 which is fixedly attached to the lower face of the arm attachment frame 3 by means of a shaft 16.

Figure 4:
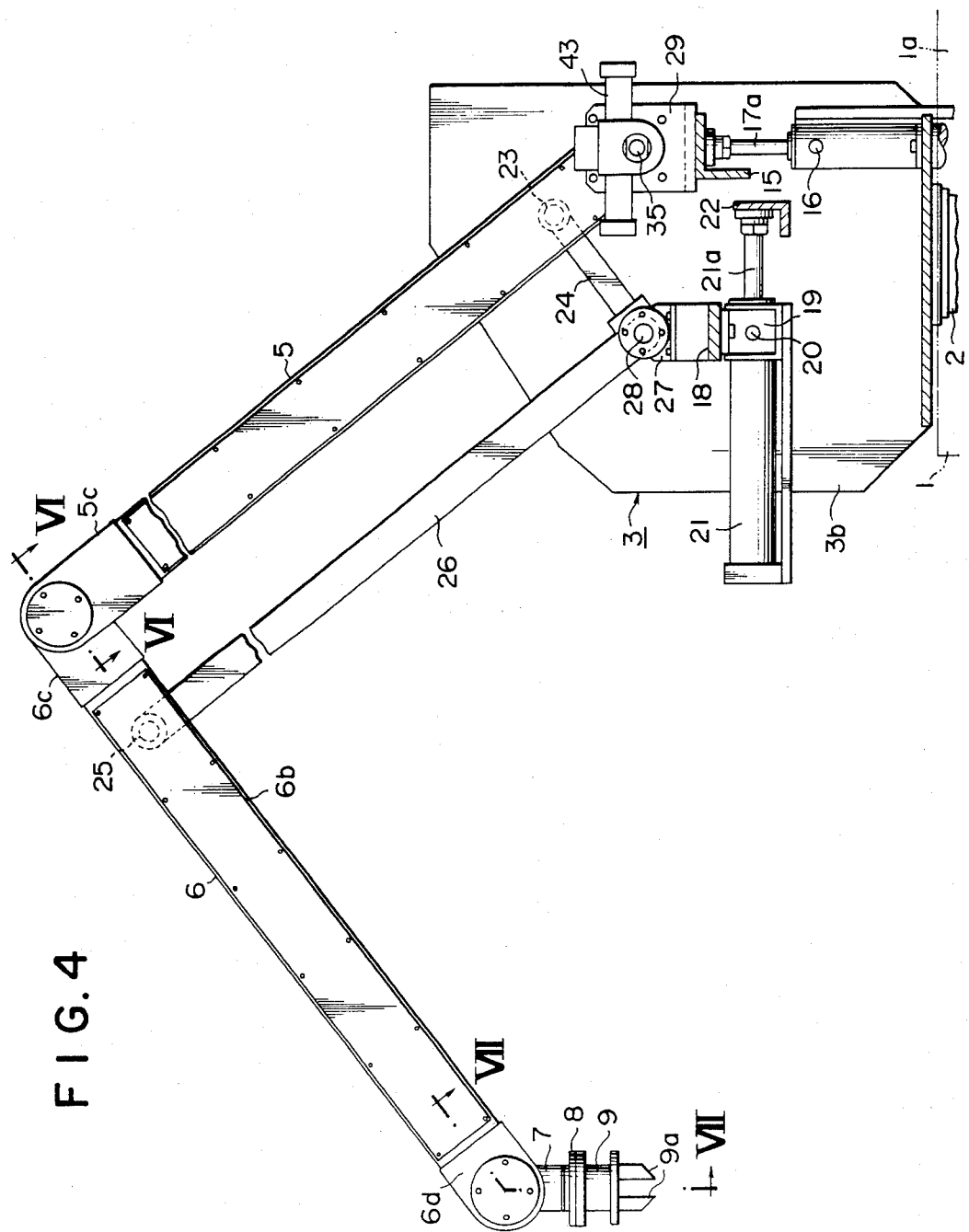
FIG. 4 is a vertical cross-sectional view taken along line IV—IV of FIG. 3.

As illustrated in FIG. 4, the vertically-displaceable plate 15 is moved up and down within the arm attachment frame 3 by reciprocating the rod 17a up and down.

Furthermore, horizontally-displaceable horizontal plate 18, which is movable back and forth, is also provided as if it forms a bridge between the horizontal guide members 14. A pair of attachment plates 19 are pendant from the lower face of the horizontal plate 18 respectively at both ends of the plate 18. By means of a shaft 20 provided between the left and right attachment plates 19, the rear extremity of a second drive source, namely, a hydraulic cylinder 21 is stopped.

The rear extremity of a rod 21a extending rearwardly from the hydraulic cylinder 21 is fixedly attached to a spacer plate 22 which extends between both side walls of the arm attachment frame 3. Thus, back and forth movements of the rod 21a cause the horizontal plate 18 to displace back and forth.

Next, the arm unit 4 will be described referring to FIGS. 4 through 6.

As seen in FIG. 4, one end of a link 24 is pivotally coupled to a shaft 23 provided at basal end portions of side walls 5a, 5b of the first arm 5 having a substantially rectangular tube-like shape. Similarly, a link 26 is pivotally connected to a shaft 25 which is provided between side walls 6a, 6b of the second arm 6 of a rectangular tube-like shape.

The free ends of the links 24, 26 are mutually rotatably connected by a connector shaft 28 of a bearing 27, thereby constructing a parallelogrammatical, quadric kinematic link mechanism(pantograph mechanism) with the first arm 5, second arm 6 and links 24, 26.

The lower face of the bearing 27 is mounted on the upper face of the horizontally-displaceable plate 18 and firmly attached to the latter by bolts or the like.

Figure 5A:
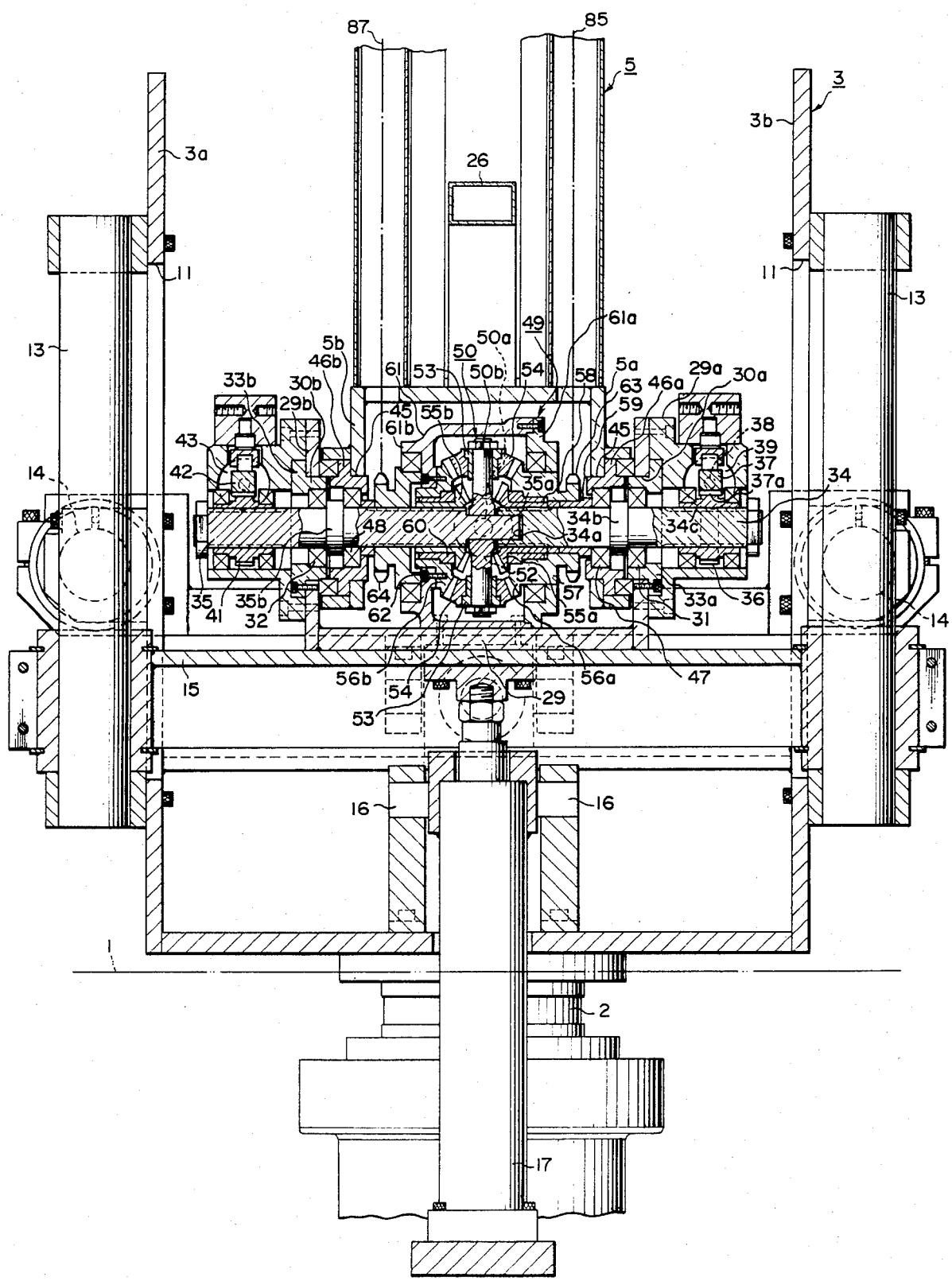
FIG. 5a is a vertical cross-sectional view taken along line V—V of FIG. 3.
Figure 5B:
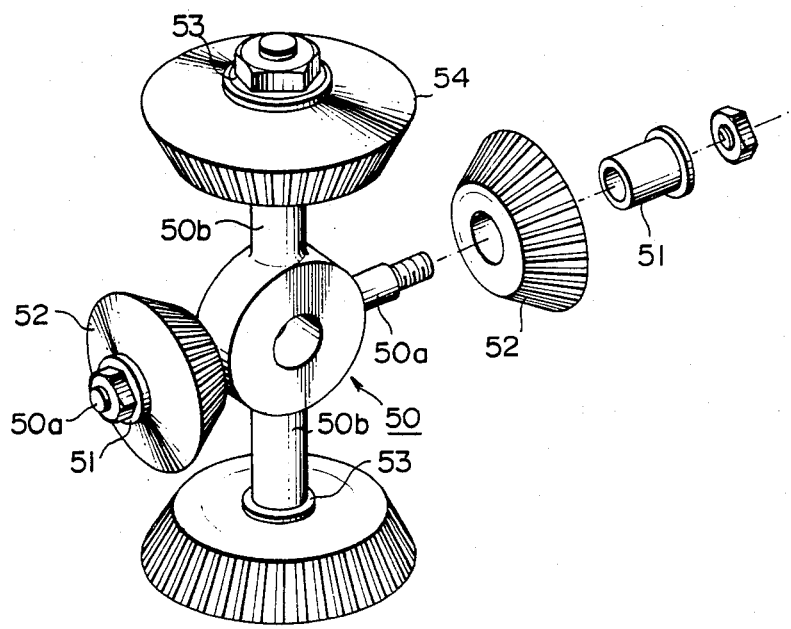
FIG. 5b is a detailed view of floating shaft 50.

Referring now to FIG. 5, the structure formed by an attachment bracket 29 fixedly provided on the vertically displaceable plate 15 and the basal end portion of the first arm 5 pivotally supported by the attachment frame 29 will be described.

On the vertically displaceable plate 15, there is fixedly provided the attachment bracket 29 which has square U-shaped configurations. Left and right upright walls 29a, 29b of the attachment bracket 29 define respectively circular through-holes 30a, 30b, over which through-holes 30a, 30b annular brackets 33a, 33b are respectively mounted to retain their corresponding bearings 31, 32.

A horizontally-extending first shaft 34, which constitutes one half of the shoulder shaft, extends through the bearing 31, while a horizontally-extending second shaft 35 constituting the remaining half of the shoulder shaft extends through the bearing 32.

A circular hole 34a is centrally bored in the end face of the first shaft 34, which end face is located within the attachment bracket 29 and which hole 34a extends along the longitudinal axis of the first shaft 34. On the other hand, the second shaft 35 defines on its end face a small diameter portion 35a which corresponds to the circular hole 34a. The small diameter portion 35a is fit in the circular hole 34a in such a manner that the first and second shafts 34, 35 are rotatable independently from each other about a common axis.

The first and second shafts 34, 35 also define ridges 34b, 35b having a somewhat larger diameter on the outer circumferences at their longitudinally mid points, whereby preventing the shafts 34, 35 from falling out leftwards or rightwards.

Keyways 34c are formed in the outer circumference of the first shaft 34 at its outer end portion. A pinion 36 is engaged with the keyways 34c in such a way that no relative rotation is permitted between the pinion 36 and keyways 34c.

Designated at numeral 37 is a rack. Teeth 37a formed in the lower face of the rack 37 are in meshing engagement with the pinion 36. The rack 37 is coupled with a piston 39a of a hydraulic cylinder 39, which serves as a third drive source, via a rod 38 extending out from both front and rear faces of the rack 37. The lack 37 rotates the pinion 36 by back and forth movements of the piston 39a of the hydraulic cylinder 39.

Designated at numeral 40 is a pipe, which connects the hydraulic cylinder 39 with a hydraulic pressure source.

The free end portion of the second shaft 35 is constructed in the same manner as the above-mentioned first shaft 34. A pinion 41 engaged with keyways 35c of the second shaft 35 is in meshing engagement with a rack 42. A fourth drive source, i.e., hydraulic cylinder 43, which displaces the rack 42 back and forth, is connected to the hydraulic source by a pipe 44.

The basal end portion of the first arm lacks its bottom wall, as shown in FIG. 5, and is formed into an inverted square U-shape. The left and right side walls 5a, 5b defines circular holes 45, 45 over which brackets 46a, 46b are fit. Bearings 47, 48 are mounted respectively on the brackets 46a, 46b.

The bearing 47 is fit over the first shaft 34, whereas the bearing 48 is fit over the second shaft 35. Accordingly, the first arm 5 is pivotally mounted on the attachment bracket 29.

On the outer circumferences of coupled parts of the first and second shafts 34, 35, there is mounted a differential transmission mechanism 49 which is formed of a combination of an inner differential gear unit and an outer differential gear unit.

Along a direction perpendicular to the small diameter portion 35a of the second shaft 35, a floating shaft 50 having a short shaft 50a and long shaft 50b arranged in the pattern of a cross is rotatably mounted. A pair of small bevel gears 52 are rotatably mounted on the short axis 50a via their corresponding bearings 51. A pair of large bevel gears 54 are rotatably mounted on the long shaft 50b through their corresponding bearings 53.

On the outer circumference of the inner extremity of the first shaft 34, a bevel gear 55a is fixedly mounted without permitting any relative rotation between the first shaft 34 and the bevel gear 55a. Another bevel bear 55b is fixedly provided on the outer circumference on the second shaft 35 without permitting any relative rotation therebetween. The bevel gears 55a, 55b engage with the small bevel gears 52 and are opposed to each other with the small bevel gears 52 interposed therebetween. Thus, a differential gear unit is formed by them.

Another differential gear unit is also provided outside the above inner differential gear unit with the same structure as the inner differential gear unit.

Furthermore, a first output shaft 57 having a large bevel gears 56a, 56b, which are engaged with the large bevel gears 54 and are mutually opposed to each other with the large bevel gears 54 interposed therebetween, is journalled on the first shaft 34 via bearings 58, 59. The large bevel gear 56b is a stationary gear and is journalled on the second shaft 35 via bearing 60. The large bevel gear 56b is fixedly attached on the inner wall of a box-like casing 61 enclosing the differential gears by means of a bolt 62 so that the large bevel gear 56b is prohibited from rotation.

The casing 61 is in turn fixed to the attachment bracket 29 by bolts or the like. On the outer circumference of a free end portion of the first output shaft 57 which extends outwardly through one of the side walls, i.e., a side wall 61a of the casing, a first sprocket 63 is fit over. Between the other side wall 61b of the casing 61 and the side wall 5b of the first arm 5, a second sprocket 64 is fit so that it rotates integrally with the second shaft 35.

Figure 6:
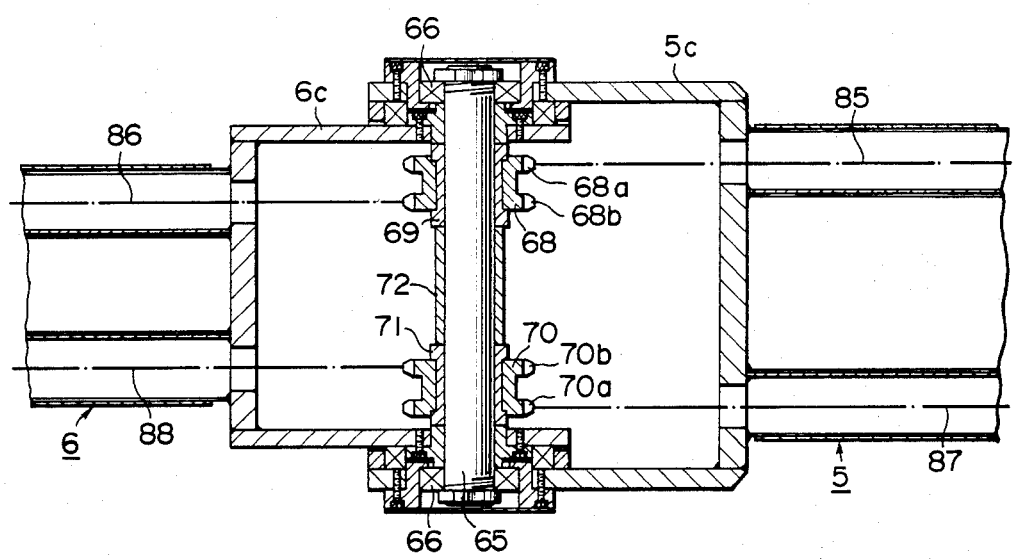
FIG. 6 is a vertical cross-sectional view taken along line VI—VI of FIG. 4.

Reference is next made to FIG. 6 to describe the coupling portion between the first arm 5 and second arm 6 and the support for the holder 8 at the free end of the second arm 6.

In a square U-shaped bracket 5c provided coextensively at the free end of the first arm 5, is loosely inserted a bracket 6c having associating square U-shaped configurations and provided coextensively with the rear end of the second arm 6. A third shaft, namely, an elbow shaft 65 is provided horizontally passing through the side walls of each of the brackets 5c, 6c.

In other words, the elbow shaft 65 is journalled at both ends thereof on the bracket 5c through their respective bearings 66, and the bracket 6c is journalled on the elbow shaft 65 through bearings 67. Accordingly, the second arm 6 is pivotally coupled to the first arm 5.

Numeral 68 indicates a third sprocket which is formed by two sprockets 68a, 68b disposed side by side as an integral part. The third sprocket 68 is journalled via a bearing 69 on the elbow shaft 65 at a location adjacent to one end thereof.

At a location adjacent to the other end of the elbow shaft 65, a fourth sprocket 70 having the same structure as the third sprocket 68, i.e., formed of sprockets 70a, 70b is journalled via a bearing 71 on the elbow shaft 65. Incidentally, numeral 72 indicates a spacer disposed between the bearing 69 and bearing 71.

First coupling means is comprised by first sprocket 63, endless chain 85, third sprocket 68, endless chain 86 and sixth sprocket 80. Second coupling means is comprised by second sprocket 64, an endless chain 87, a fourth sprocket 70, endless chain 88 and fifth sprocket 76. Third coupling means is temporarily comprised, in accordance with changing-over of change-over valve 90, by small bevel gear 55b, small bevel gears 52, large bevel gears 54, first output shaft 35 and endless chains 85 and 86.

Figure 7:
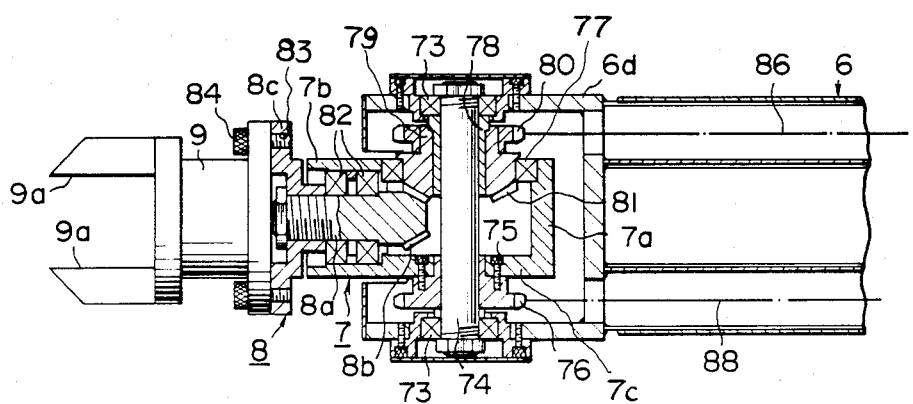
FIG. 7 is a vertical cross-sectional view taken along line VII—VII of FIG. 4.

Next, the attachment structure of the holder case 7 will be described with reference to FIG. 7.

A fourth shaft, namely, a wrist shaft 74 is horizontally arranged extending through both side walls of a square U-shaped bracket 6d coextensively provided at the free ned of the second arm 6. The wrist shaft 74 is journalled at both ends by means of bearings 73, 73.

The holder case 7 is constructed by a cylindrical main body 7a, which has a bottom wall 7c but is open at the other end, and a cylindrical holder retaining part 7b which extends through a forward side wall portion of the main body 7a and protrodes forwardly. The wrist shaft 74 extends through the bottom wall 7c of the main body 7a.

A fifth sprocket 76 is fixedly mounted on the bottom wall 7c of the main body 7a by bolts 75. The fifth sprocket 76 is rotatably fit over the wrist shaft 74. A cylindrical fifth shaft 79 is also provided while being journalled at its outer circumference by a bearing 77 fit in the opening of the main body 7a and also journalled by the wrist shaft 74 via a bearing 78. A sixth sprocket 80 is fit on the outer circumference of the fifth shaft 79 at a location adjacent to the free end of the shaft 79. A bevel gear 81 is formed in the outer circumference of the fifth shaft 79 at a location adjacent to its inner end within the main body 7a.

Numeral 8a indicates a shaft of the holder 8, which shaft extends in the rear-to-forward direction. The outer circumference of the shaft 8a is rotatably enclosed by the holder retaining part 7b of the holder case 7 with a bearing 82 interposed therebetween.

In the rear extremity of the shaft 8a, a bevel gear 8b is formed and is kept in meshing engagement with the bevel gear 81.

A flange 8c is fixedly provided on the outer circumference of the shaft 8a along the forward extremity of the shaft 8a without allowing any relative rotation therebetween.

Along the peripheral edge of the flange 8c, through holes 83 are bored in the rear-to-forward direction through the flange 8c. The hand 9 having a pair of fingers 9a, 9a is mounted by bolts 84 inserted through the through-holes 83.

Figure 8:
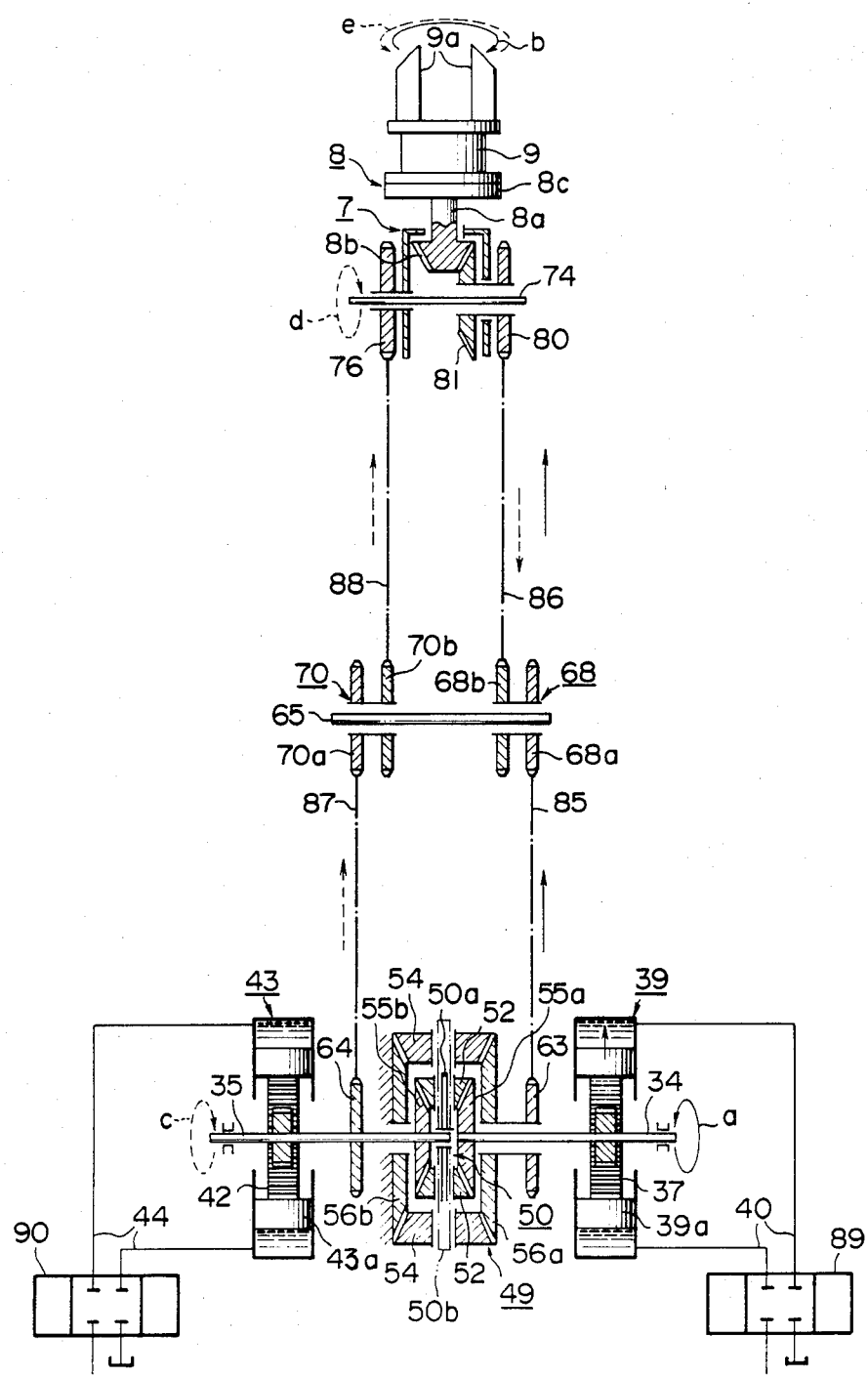
FIG. 8 is a skelton view of the arm unit shown in FIG. 4.

FIG. 8 is a skelton view showing the way of coupling of the holder 8, wrist shaft 74, elbow shaft 65, first shaft 34, second shaft 35 and differential transmission mechanism 49.

As shown in FIG. 8, an endless chain 85 is wrapped over the first sprocket 63 and the sprocket 68a of the third sprocket 68. Similarly, another endless chain 86 is wrapped over the sprocket 68b and the fixth sprocket 80.

Between the second sprocket 64 and the sprocket 70a of the fourth sprocket 70, an endless chain 87 is extended. A further endless chain 88 is wrapped over the sprocket 70b and the fifth sprocket 76.

Numerals 89, 90 indicate respectively change-over valves for controlling motions of the pistons of the hydraulic cylinders 39, 43.

Next, based on FIG. 8, the operation of the arm unit 3 will be described in the order of the rotation of the holder 8, the turning of the holder 8 relative to the wrist shaft 74 and the bending motions of the first arm 5 and second arm 6.

The motion of each sprocket and differential gears upon rotating the holder 8, i.e., upon rotating the hand 9 to grip an article will be described successively following the arrows of full line.

By switching the change-over valve 89 to shift the piston in the hydraulic cylinder 39, for example, forwards, the first shaft 34 is rotated via the pinion 36 and the small bevel gear is then rotated.

Since the second shaft 35, small bevel gear 55b and large bevel gear 56b are kept stationary at this time, the small bevel gear 55a rotates the floating shaft 50 through the small bevel gear 52 and the large bevel gear 56a through the large bevel gear 54, thereby rotating the first sprocket 63 of the first output shaft 57.

This rotation of the first sprocket 63 then turns the endless chain 85 in the direction shown by the arrow of full line and, similarly, rotates the sixth sprocket 80 via the third sprocket 68 and endless chain 86.

Then, the fifth shaft 79 is rotated and, through the meshing engagement between the bevel gear 81 and bevel gear 8b, the holder 8 is turned in a direction indicated by the arrow b of full line.

When the piston 39a is retreated, the directions of movement and turning of the relevant parts are reversed and the holder 8 is turned in a direction opposite to the arrow b.

An oscillation motion of the holder case 7 in the up-to-down direction will then be described following the arrows of broken line.

When the piston 43a in the hydraulic cylinder 43 is shifted forwards by switching the change-over valve 90, the second shaft 35, namely, the second sprocket 64 is rotated in a direction indicated by the arrow c of broken line.

Then, the endless chain 87 turns through the sprocket 70 the endless chain 88 in the direction indicated by the arrow of broken line. Thus, the fifth sprocket 76, namely, the holder case 7 secured integrally with the fifth sprocket 76 is caused to perform an oscillation motion about the fourth shaft 74 as shown by an arrow d of broken line.

Here, the oscillation motion of the holder case 7 causes, through the bevel gear 81 and bevel gear 8b in meshing engagement with the former bevel gear, the holder 8 to turn in a direction indicated by an arrow b of full line. The thus-induced turning motion of the holder 8 can be eliminated by the below-described complementary turning operation and the motion of the robot can thus be limited to the oscillation motion of the holder case 7.

Namely, an rotation of the second sprocket 64 induces a rotation of the second shaft 35, thereby rotating the small bevel gear 55b. At this stage, the small bevel gear 55a and large bevel gear 56a are kept stationary. Thus, the rotation of the small bevel gear 55b is transmitted, via the small bevel gear 52 and large bevel gear 54, to the large bevel gear 56a, namely, the first output shaft 57.

As a result, the first sprocket 63 causes, through the endless chains 85, 86, to turn the holder 8 in a direction opposite to that mentioned above as shown by the arrow e and to give the same torque as that of the holder 8 in a direction opposite to that in which the holder 8 is about to turn. Accordingly, the holder 8 performs only an oscillation motion without developing any rotation.

When the piston 43a is retreated contrary to the above case, the operation is carried out in a direction opposite to that mentioned above.

Next, the behavior of the holder 8 when the first arm 5 is rotated will be described.

Here, the first shaft 34 and second shaft 35 are prohibited from rotation by their corresponding hydraulic cylinders 39, 43. Thus, only the endless chains 85, 87 are moved relative to each other.

Figure 9:
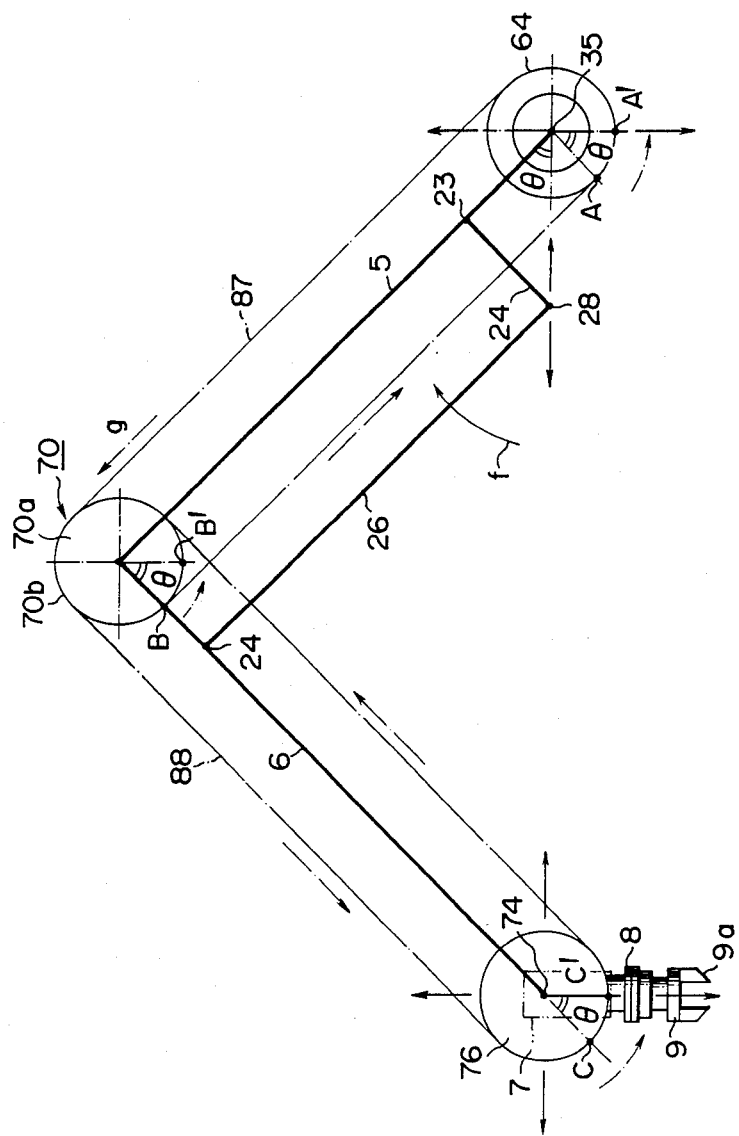
FIG. 9 is a skelton view showing endless chains extending along the arm unit.

As shown in FIG. 9, when the shaft 28 of the quadric kinematic link mechanism is fixed, the basal end of the first arm 5 is displaced downwards and the first arm 5 is turned clockwise by a slight angle $\theta$, the endless chain 87 is turned in the direction shown by an arrow g of dot-dash line and Point A on the endless chain 87 moves by the same angle $\theta$ to Point A'.

By the above movement, Point B on the sprocket 70a of the fourth sprocket 70 moves by the same angle to Point B'. Similarly, Point B on the endless chain 88 on the sprocket 70b moves to Point B'. Thus, Point C on the fifth sprocket 76 also moves to Point C'.

In other words, by turning the holder case 7 in an opposite direction by the same angle θ as the turning angle θ of the first arm 5, any displacement due to a rotation of the second arm 6 can be compensated and the holder 6 can always be shifted while being maintained in a vertical position.

A rotation of the holder 8 induced in a direction shown by the arrow e in FIG. 8 due to such an oscillation motion of the holder case 7 can be compensated as follow. Accompanied with a turning motion of the first arm 5, the sixth sprocket 80 is rotated through the endless chains 85, 86, thereby imparting a torque shown by the arrow b to the holder 8.

When turning the second arm 6 relative to the first arm 5, the latter half motions of the above motions, i.e., the motions of the endless chains 88, 86 are concerned. Similar to the above-mentioned case, the holder 8 is shifted while always kept in a vertical position.

Accordingly, as shown in FIG. 1, the article 10 hanged in a vertical direction by the hand 9 can be kept in the same vertically-hanged position even after a turning motion of the arm unit 4 and can thus been freely moved within a frame A indicated by phantom lines.

The most simple method for easily carrying out the above-mentioned compensatory motion is to make the sizes, namely, the effective diameters of all the sprockets identical. Needless to say, it is necessary to compensate the rotation of holder induced by an oscillation motion of the holder case by making a suitable selection as to the gear ratio of the bevel gear of the holder to the bevel gear for rotating the holder as well as the reduction ratio of bevel gears in the differential transmission mechanism.

In the above description, the turning motion of the holder, oscillation motion of the holder case and turning motion of the arm unit were described independently. Obviously, their motions can be performed independently without inducing any additional motion even when two or three motions of the above three motions are performed in combination.

Accordingly, an extent of movement for each motion of the holder may be transferred to each part of the industrial robot without developing any induced motion at other parts when teaching a handling operation to the robot.

As has been described in detail, the articulated arm unit according to this invention has such merits that each turning or oscillation motion of the holder can be performed without developing any induced motion and a work assignment can be readily taught, although it has a structure making use of gear trains.

Furthermore, handling work can be performed easily in narrow places because the holder case can be constructed in a small size.

In addition, it can also bring about a great merit that handling work has been made simpler, because the position of the wrist portion of the arm unit can perform a parallel movement independently from the position of an article or the like in the absolute coordinate system by restricting the degree of freedom of each part so as to shift the basal end portion of the first arm in the up-and-down direction and to shift the connector portion of the pair of links only in a horizontal direction.

In the above embodiment, each output shaft and its corresponding rotary shaft are connected by an endless chain wrapped between a combination of sprockets. However, similar effect can be achieved using another rotary transmission system such as a slip-free belt or the like in place of the endless chain.

Needless to say, besides hydraulic cylinders, air cylinders, motors and the like may be equally employed as drive power sources.

Although the present invention has been described in some detail by way of illustration and example for purposes of clarity or understanding, it will, of course, be understood that various changes and modifications thereof may be made without departing from the scope of the present invention as set forth herein.

What is claimed is:

1. In an industrial robot equipped with an articulated arm unit including a first arm pivotally attached at its basal end portion to a shoulder shaft, a second arm pivotally coupled at its basal end portion to the free end of the first arm by means of an elbow shaft, a holder case pivotally connected to the free end of the second arm by means of a wrist shaft, and a holder supported by the holder case in such a way that the holder is turnable about an axis, which extends perpendicularly to the wrist shaft, by means of a shaft journalled on the wrist shaft, wherein the improvement comprises:

a first shaft and a second shaft disposed on the same axis and rotatable independently from each other to thereby form the shoulder shaft for the first arm;

a differential transmission mechanism comprising a floating shaft extending perpendicularly to the second shaft and journalled on the second shaft, a pair of small bevel gears journalled on the floating shaft with the floating shaft interposed therebetween, a pair of large bevel gears journalled on the floating shaft respectively at locations adjacent to both free ends of the floating shaft, a pair of small bevel gears provided respectively on the first shaft and the second shaft in a face-to-face relationship and with the first mentioned pair of small bevel gears interposed therebetween so as to form an inner bevel gear unit, and a pair of large bevel gears provided respectively on the first shaft and the second shaft in a face-to-face relationship and with the first mentioned pair of large bevel gears interposed therebetween so as to form an outer bevel gear unit, said differential transmission mechanism arranged over mutually-opposing end portions of the first and the second shafts; and a first drive means formed by the first shaft and a first coupling means comprising a combination of a pair of sprockets and endless chain extending therebetween and being connected thereto for rotating the holder, and a second drive means formed by the second shaft and a second coupling means comprising a combination of a pair of sprockets and another endless chain extending therebetween, and being connected thereto for rotating the holder case as well as by a third coupling means connected to the differential transmission mechanism so as to compensatively rotate the holder.

2. The industrial robot according to claim 1, wherein each of the coupling means comprises a combination of a pair of sprockets and an endless chain extending therebetween.

3. The industrial robot according to claim 1, wherein the first arm further comprises drive means adapted to displace the basal end portion of the first arm in the up-and-down direction.

4. The industrial robot according to claim 1, wherein the first and second arms form a quadric kinematic link mechanism together with a pair of links which are pivotally connected at their one ends to the mid points of the first and second arms and also pivotally connected together at their free ends by means of a connector shaft.

5. The industrial robot according to claim 4, wherein the connector shaft is further provided with drive means capable of displacing the connector shaft in the horizontal direction.

6. The industrial robot according to claim 1, wherein the first arm further comprises a drive means adapted to displace the basal end portion of the first arm in the up-and-down direction.

7. The industrial robot according to claim 1, wherein the first and the second arms form a quadric kinematic link mechanism together with a pair of links which are pivotally connected at their one ends to the mid points of the first and the second arms and also pivotally connected together at their free ends by means of a connector shaft.

8. The industrial robot according to claim 2, wherein the connector shaft is further provided with drive means capable of displacing the connector shaft in the horizontal direction.

* * * * *